(12) United States Patent
Garimella et al.

(10) Patent No.: US 11,854,256 B1
(45) Date of Patent: Dec. 26, 2023

(54) METHODS AND DEVICES FOR EARTH REMOTE SENSING USING STEREOSCOPIC HYPERSPECTRAL IMAGING IN THE VISIBLE (VIS) AND INFRARED (IR) BANDS

(71) Applicant: ACME AtronOmatic, LLC, Orlando, FL (US)

(72) Inventors: Sarvesh Garimella, Portland, OR (US); Paul Heinrich Kocyla, Windeck (DE)

(73) Assignee: Acme Atronomatic, LLC, Orlando, FL (US)

( * ) Notice: Subject to any disclaimer, the term of this patent is extended or adjusted under 35 U.S.C. 154(b) by 0 days.

(21) Appl. No.: 18/068,189

(22) Filed: Dec. 19, 2022

Related U.S. Application Data

(62) Division of application No. 16/925,164, filed on Jul. 9, 2020, now Pat. No. 11,532,155.

(60) Provisional application No. 62/871,929, filed on Jul. 9, 2019.

(51) Int. Cl.

| | |
|---|---|
| *G06V 20/13* | (2022.01) |
| *B64G 1/10* | (2006.01) |
| *G06N 3/08* | (2023.01) |
| *G06V 10/75* | (2022.01) |
| *G06F 18/24* | (2023.01) |

(52) U.S. Cl.
CPC ........... *G06V 20/13* (2022.01); *B64G 1/1021* (2013.01); *G06F 18/24* (2023.01); *G06N 3/08* (2013.01); *G06V 10/751* (2022.01)

(58) Field of Classification Search
CPC .... G06V 20/13; G06V 10/751; B64G 1/1021; G06K 9/6267; G06N 3/08
See application file for complete search history.

(56) References Cited

U.S. PATENT DOCUMENTS

| | | | |
|---|---|---|---|
| 10,169,856 B1 | 1/2019 | Farnsworth | |
| 10,641,658 B1 | 5/2020 | Yu | |
| 2005/0286770 A1 | 12/2005 | Hirata | |
| 2012/0035871 A1* | 2/2012 | Cofta | H01L 31/042 702/62 |
| 2012/0141021 A1 | 6/2012 | Brinson, Jr. | |
| 2015/0075066 A1 | 3/2015 | Stowe | |
| 2016/0204866 A1* | 7/2016 | Boroson | H04B 10/61 398/97 |
| 2016/0300375 A1* | 10/2016 | Beckett | G06F 16/29 |
| 2017/0026588 A1* | 1/2017 | Kester | G01J 5/0804 |
| 2017/0200259 A1 | 7/2017 | Yang | |
| 2018/0157255 A1* | 6/2018 | Halverson | G05D 1/0055 |

(Continued)

*Primary Examiner* — David Bilodeau
(74) *Attorney, Agent, or Firm* — Allen, Dyer, Doppelt & Gilchrist, P.A.

(57) ABSTRACT

A hyperspectral stereoscopic CubeSat with computer vision and artificial intelligence capabilities consists of a device and a data processing methodology. The device comprises a number of VIS-NIR-TIR hyperspectral sensors, a central processor with memory, a supervisor system running independently of the imager system, radios, a solar panel and battery system, and an active attitude control system. The device is launched into low earth orbit to capture, process, and transmit stereoscopic hyperspectral imagery in the visible and infrared portions of the electromagnetic spectrum. The processing methodology therein comprises computer vision and convolutional neural network algorithms to perform spectral feature identification and data transformations.

18 Claims, 4 Drawing Sheets

(56) References Cited

U.S. PATENT DOCUMENTS

| | | | |
|---|---|---|---|
| 2018/0180476 A1 | 6/2018 | Richarte et al. | |
| 2018/0239948 A1* | 8/2018 | Rutschman | G06T 7/20 |
| 2018/0239982 A1* | 8/2018 | Rutschman | H04N 23/60 |
| 2018/0288303 A1 | 10/2018 | Wang et al. | |
| 2019/0389602 A1* | 12/2019 | Schilling | B64G 1/242 |
| 2020/0200683 A1 | 6/2020 | Aronov et al. | |
| 2020/0255165 A1* | 8/2020 | Abbasi | B64G 1/244 |
| 2020/0372238 A1 | 11/2020 | Tajika | |
| 2022/0097872 A1* | 3/2022 | Sternheim | B64G 1/10 |

\* cited by examiner

METHODS AND DEVICES FOR EARTH REMOTE SENSING USING STEREOSCOPIC HYPERSPECTRAL IMAGING IN THE VISIBLE (VIS) AND INFRARED (IR) BANDS

CROSS-REFERENCE TO RELATED APPLICATION

This application is a divisional of U.S. Non-provisional patent application Ser. No. 16/925,164, filed on Jul. 9, 2020, which claims the benefit of U.S. Provisional Patent Application Ser. No. 62/871,929, filed on Jul. 9, 2019, the contents of which are herein incorporated by reference in their entirety.

FIELD OF THE INVENTION

The present invention relates to a synthetic baseline stereoscopic hyperspectral imager for the remote sensing of the Earth's atmosphere, ocean, and land from a CubeSat platform in Low Earth Orbit and to a method that leverages artificial intelligence for processing the collected data.

BACKGROUND OF THE INVENTION

CubeSats are small satellites with between one and several 10 $cm^3$ units of volume that are launched into Low Earth Orbit (LEO), often around 400 km altitude. Many have been launched for a variety of applications, including remote sensing.

Hyperspectral cameras are sensors that are capable of capturing images over a range of the electromagnetic spectrum with high spectral resolution. In particular, imagers designed for the visible to near-infrared (VIS-NIR) portions of the spectrum can capture imagery across a range of several hundred nanometers with spectral bands spaced a few nanometers apart. The hyperspectral imagery they produce illustrate image features at different specific wavelengths, which is useful for highlighting and classifying particular features of interest. These sensors are used for remote sensing applications, including vegetation mapping and atmospheric observations of smoke, haze, and clouds. Also, hyperspectral measurements may be made at wavelength ranges in the thermal-infrared (TIR) and can be used to retrieve information from the surface and different heights in the atmosphere.

Stereoscopic photogrammetry utilizes a pair of cameras separated by a known baseline distance in order to triangulate depth information of objects in the field of view. A feature's depth is inferred from its disparity, which is defined as the number of pixels by which the feature offset in one camera's image with respect to the other. With an orbital platform, a single satellite can be used to collect stereoscopic imagery, since the change in satellite's position along the path of the orbit can be used to infer a "synthetic" baseline distance between two images of the same scene captured at subsequent times. This synthetic baseline approach for stereoscopic hyperspectral photogrammetry allows for the triangulation of depth information of features in all spectral bands without requiring any physical separation or two individual sensors.

Artificial intelligence (AI), specifically computer vision optical flow analysis, can be used for estimating the pixel disparity of discrete image features in a computationally efficient manner. Another type of AI, specifically convolutional neural networks, may be used for image classification and data transformations. With a coupled optical flow algorithm and convolutional neural network image classifier, the three-dimensional coordinates of specifically-identified features can be retrieved. In addition, a type of convolutional neural network called an autoencoder is able to learn mappings between high dimensional representations of information and low dimensional (compressed) "latent" representations in a statistically optimal manner. An autoencoder consists of an encoder and decoder portions that learn the data compression and decompression mappings, respectively. Additionally, convolutional neural networks may be used for so-called "super resolution" transformations to infer higher resolution details by learning how lower resolution inputs map to higher resolution ground truth examples.

SUMMARY OF THE INVENTION

It is an object of the invention to capture hyperspectral imagery from a CubeSat platform and transmit this imagery to Earth. It is also an object of the invention for this imagery to be stereoscopic in nature by utilizing a synthetic baseline along the path of the orbit. It is also an object of the invention to infer depth and feature information for image features across the VIS-NIR-TIR spectrum using photogrammetry for processing of the hyperspectral imagery. It is also an object of the invention to create super resolution imagery for wavelength bands with lower spatial resolution. The device described in this invention is a hyperspectral imaging Cubesat satellite. It consists of a number of VIS-NIR-TIR sensors for hyperspectral image capture, processors with memory for image processing and storage, a supervisor system running independently of the imager system, radios for data transmission and communication, a solar panel and battery system for power, and an active attitude control system based on 3-axes-rate gyros, magnetometers, a sun sensor, and magnetorquers. The method described in this invention consists of capturing hyperspectral imagery from LEO, processing this imagery using artificial intelligence to triangulate depth and feature information from all spectral bands, transmitting both feature information and variably compressed imagery to a receiver, and further post-processing the data after receipt.

DETAILED DESCRIPTION OF THE PREFERRED EMBODIMENTS

In the summary of the invention, provided above, and in the descriptions of certain preferred embodiments of the invention, reference is made to particular features of the device and method. It is to be understood that the disclosure of the invention in this specification includes all possible combinations of such particular features, regardless of whether a combination is explicitly described. For instance, where a particular feature is disclosed in the context of a particular aspect or embodiment of the invention, that feature can also be used, to the extent possible, in combination with and/or in the context of other particular aspects and embodiments of the invention, and in the invention generally.

As explained above, there is a need for a device and method to capture, process, and transmit hyperspectral stereoscopic imagery to Earth from low earth orbit. In some embodiments, this may be accomplished by using a CubeSat device and a method leveraging computer vision and convolutional neural networks. The capturing of stereoscopic imagery may be accomplished by utilizing a synthetic baseline along the path of the orbit to infer depth information. Onboard data processing may be used for identifying image features across the VIS-NIR-TIR spectrum.

Figure 1:
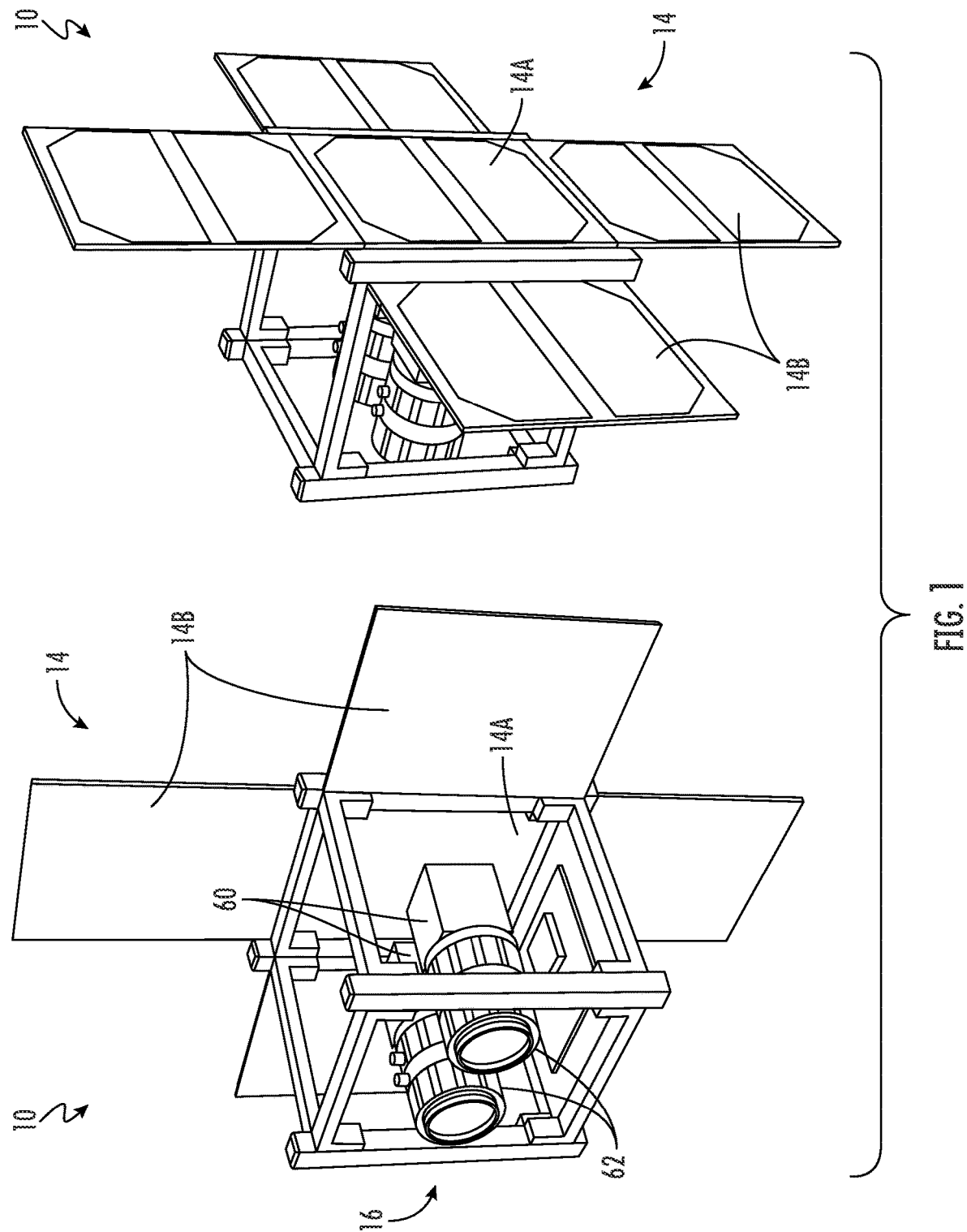
FIG. 1 is an illustration of the preferred embodiment of the CubeSat device
Figure 2:
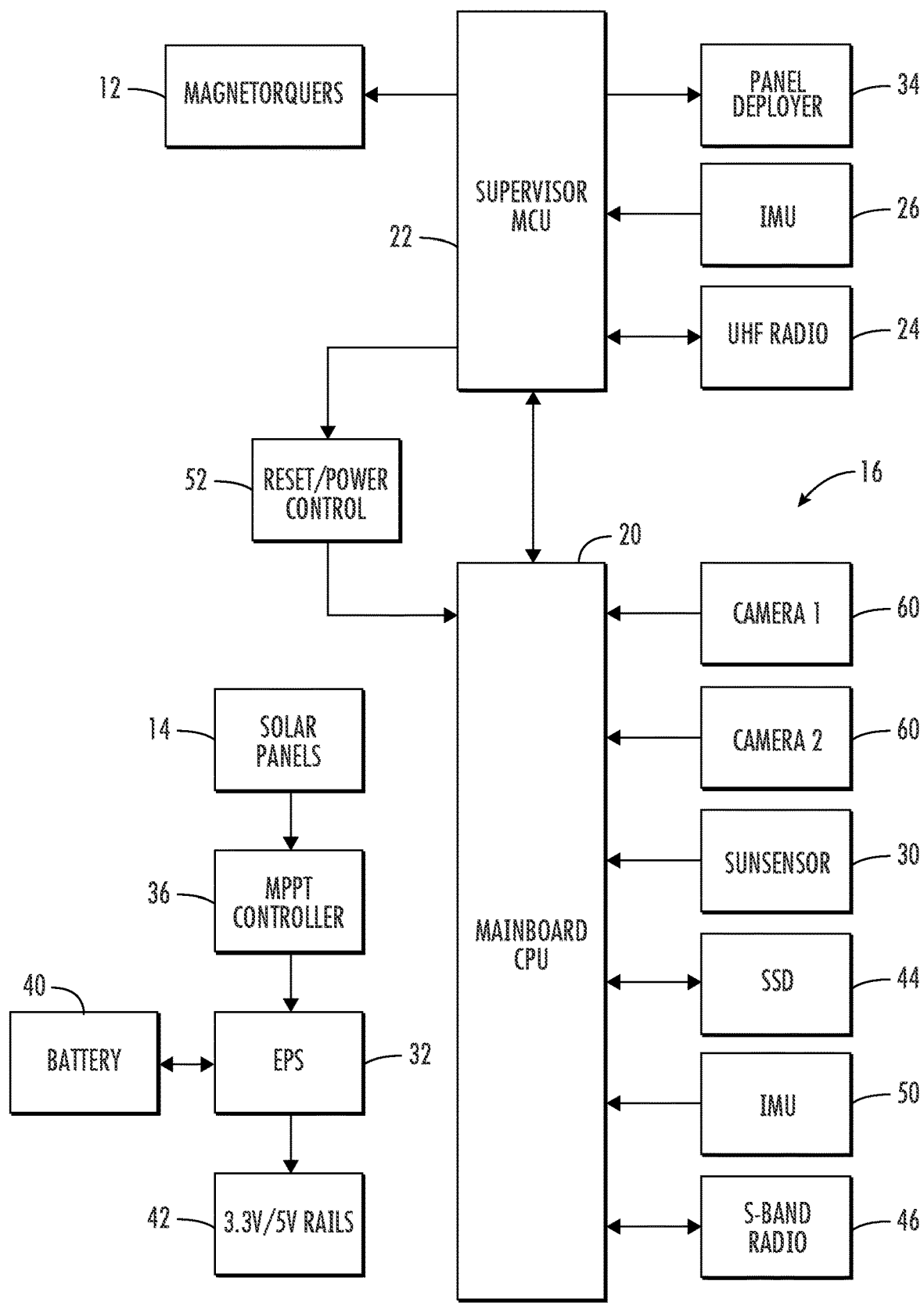
FIG. 2 is block diagram of the preferred embodiment of the system components of the CubeSat device

In particular, the preferred embodiment of a CubeSat device 10 (FIG. 1) consists of several subsystems: attitude determination and control system (ADCS), the electric power system (EPS), the main board, the supervisor, and the sensor system (FIG. 2).

After launch into LEO, the CubeSat is actively detumbled with magnetorquers 12 using the B-dot algorithm. Once the rotation rate is low enough, solar panels 14 are deployed, providing electrical power, and the satellite 10 starts performing the attitude control algorithm such that the sensors 16 are aligned to have a nadir field of view. When the desired attitude is reached, the imaging sensors 16 and the main CPU 20 are powered up, and the satellite 10 begins to capture, process, store, and transmit the imaging data through a high bandwidth downlink. The satellite 10 has a supervisor system 22 running independently of the imager. The supervisor 22 is accessed through a narrow bandwidth radio 24 to receive a beacon to check housekeeping data and to control the main processor 20.

The ADCS comprises a magnetorquer 12, an inertial measurement unit (IMU) 26, sun sensor 30, and detumbling algorithm. The magnetorquer 12 consists of three orthogonally aligned electromagnets which interact with the Earth's magnetic field. The electromagnets apply torques to the satellite 10 in order to set a desired attitude towards the Earth. Depending on the specific embodiment, the electromagnets may be embedded coil or air core variants. The IMU 26 consists of an integrated microelectromechanical systems (MEMS) gyroscope component that can measure magnetic fields and rotation rates along all three-dimensional axes. The sun sensor 30 determines the attitude of the satellite 10 towards the sun. Paired with the IMU 26, the sun sensor 30 allows the attitude of the satellite 30 with respect to the Earth to be determined. Depending on the specific embodiment, a miniature CMOS camera with an attenuation filter may be used as camera-based sun sensor. The B-dot algorithm uses variability in Earth's magnetic field over a short time interval to determine the control torque applied to a body and is used for detumbling the CubeSat 10. A Kalman filter approach using IMU 26, magnetorquer 12, and sun sensor 30 data has been demonstrated to maintain attitude accuracy to less than 1°.

The EPS 32 comprises solar panels 14, a panel deployer 34, a maximum power point tracking (MPPT) controller 36, a battery 40, and DC/DC converters 42. Depending on the specific embodiment, each solar panel 14 consists of two triple-junction solar cells mounted on aluminum PCB material. There is one fixed and four deployable panels 14A, 14B, which will be aligned on a common plane after deployment. The deployable panels 14B are mounted on spring loaded hinges. Depending on the power requirements, each deployable panel 14B may consist of two panels which are folded to the size of a side-wall. The panel deployer 34 unfolds the solar panels 14 for use in orbit. Prior to deployment, the panels 14 are forced to align to the side walls of the satellite 10 and held in place by a melting fuse. The fuse consists of a thin nylon wire wrapped around a heating resistor. When power is applied to the resistor, the wire melts and releases the spring-loaded panels 14. The MPPT controller 36 is a system to maximize the power output of a solar cell 14. A fully integrated MPPT 36 may be used to charge the onboard batteries 40 and power the system. Depending on the specific embodiment, the battery 40 may be a 3.7V LI-Ion cell or a set of cells. It has enough capacity to provide power to the system 32 during phases of low solar cell output. Depending on the orbital parameters, these low solar phases may occur over the night side of the Earth. The subsystem components may operate on either 3.3V or 5V. The main bus voltage of 3.7V is converted to these voltages by switching regulators 42. Power output to the subsystems is protected against short-circuit and overcurrent to avoid fatal power loss in case of a subsystem failure.

The main board 20 comprises processing units, a storage drive 44, and an S-band radio 46. Depending on the specific embodiment, the CPU 20 is a multicore ARM processor with USB 3.0 and PCIe capability as well as a graphics processing unit (GPU). The main board 20 interfaces with the hyperspectral imagers 16, RAM, SSD hard disk 44, the sun sensor 30, an IMU 50 and the high bandwidth S-Band radio 46. The main board 20 also performs the image data processing and attitude control. The SSD 44 is a high-volume data storage device with SATA or PCIe interface. It is used to buffer the high amount of data from the imagers 16 in case of low downlink bandwidth and as an intermediate storage for on-board processing. A high bandwidth RF radio 46 is used for downloading the image data. Different downlink methods can be used: e.g. broadcasting towards the Earth with a patch antenna with a set of receiving ground stations or using a satellite-based data network. In the latter case, a patch antenna array would be arranged in the same plane as the solar cells 14.

The supervisor comprises the microcontroller unit (MCU) 22, the UHF radio 24, a reset/power control 52, and various interfaces. Depending on the specific embodiment, the supervisor MCU 22 may be a low-power ARM Cortex M0 microcontroller. It is responsible for detumbling the satellite 10 after orbit injection, serving as a redundant ADCS, deploying the solar panels 14 and antenna array, maintaining low-level control over the mainboard 20 and its subsystems, and transmitting of beacon and housekeeping data. The supervisor 22 can be accessed from any HAM ground station through a half-duplex narrow bandwidth link. Either a monopole, a dipole or a patch antenna may be used. The supervisor 22 has low-level power control over the mainboard. It can reset the mainboard and its subsystems in case of a system crash. The supervisor 22 is responsible for interfacing the magnetorquer 12 and the various EPS 32 subsystems. The mainboard 20 can communicate to these systems through the supervisor 22. In case of a temporary mainboard system malfunction, the supervisor 22 can perform rudimentary attitude control to prevent the satellite 10 from gaining momentum from parasitic forces like drag or solar wind. The supervisor 22 will have a dedicated solar cell 14 as a redundant power source.

The sensor system 16 comprises a number of VIS-NIR-TIR hyperspectral sensors 60 for image capture at many specific wavelength bands in the visible and infrared portions of the electromagnetic spectrum. In the preferred embodiment, a combination of CMOS snapshot mosaic sensors and miniature bolometers are used to capture imagery over a two-dimensional area (as opposed to a pushbroom methodology that sweeps a single line at a time). Two or more sensors may be coupled with shared or independent optics to increase the observable spectral range of the sensor system 16. The sensors 60 may be directly or via a beam splitter coupled with a C-Mount interface to one or more VIS-NIR fixed focal length lenses 62 with broadband anti-reflection coating. The bolometers may have separate optics specifically designed specifically for thermal measurements. All sensor optics are oriented in a nadir configuration to capture Earth imagery.

Figure 3:
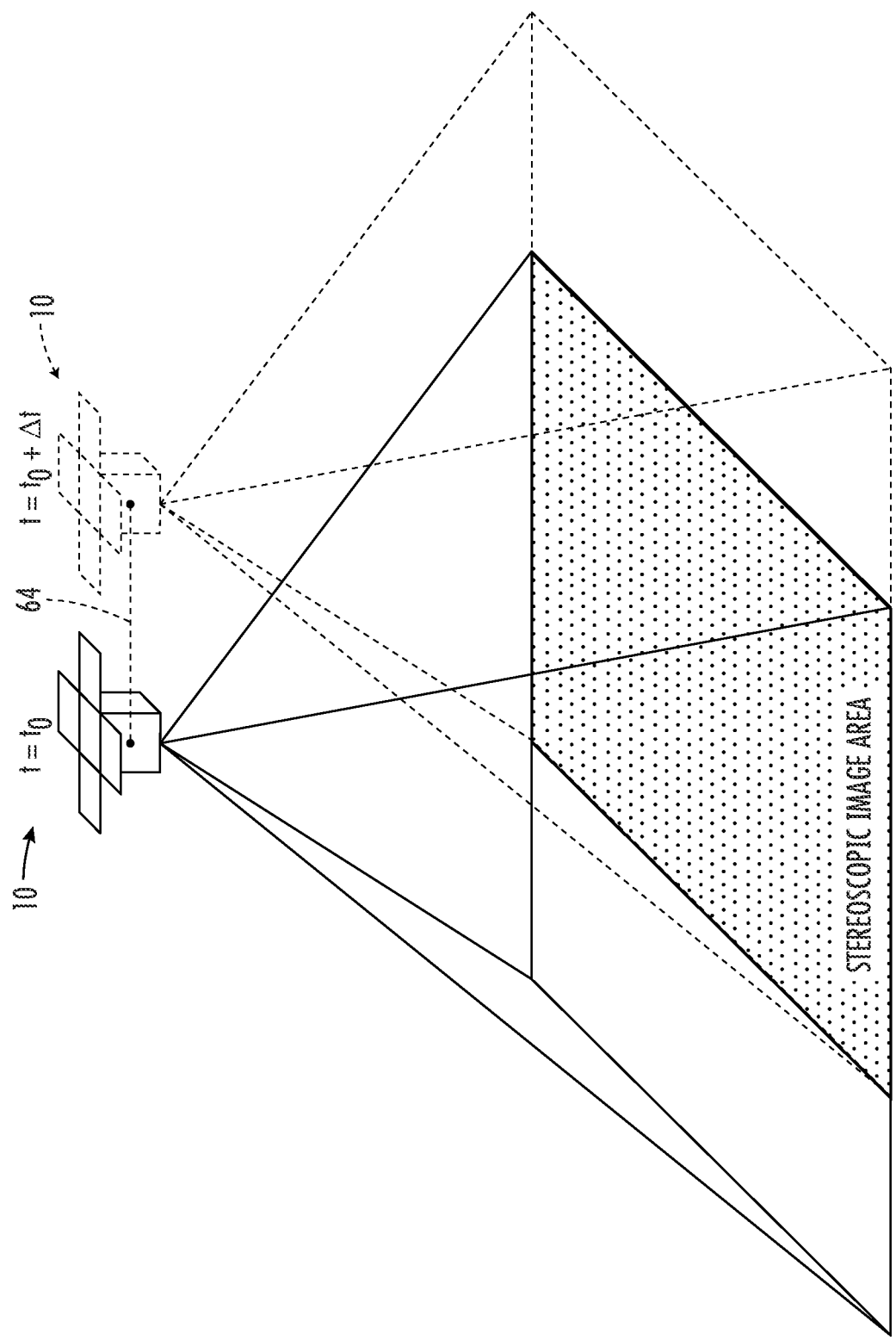
FIG. 3 is diagram illustrating the method stereoscopic photogrammetry using a synthetic baseline

The coordinates of a given feature may be triangulated from a pair of subsequent images captured from the satellite 10 at known locations, the known synthetic baseline distance 64 between two images (FIG. 3), the known focal length of the optical setup, and the observed pixel disparity of the feature between the two images. The precise location of CubeSats 10 are available from NORAD to within 200 m. The synthetic baselines 64 are calculated by integrating the orbital velocity along the path of the orbit. The calculated distance and direction away from the satellite's known position yields an estimate of the feature coordinates.

Raw imagery may be used to infer depth and feature information from stereoscopic pairs of hyperspectral images at various baseline 64 distances, and it may also be transmitted in its raw form for post-processing. Imagery may also be processed on board the satellite 10 to extract and transmit specific feature locations and spectral information. The image data may be transformed into a list of features by a convolutional neural network trained to perform semantic segmentation (such as Microsoft's ResNet); a list of the features and their locations (as inferred from the photogrammetry approach) may be transmitted along with or instead of imagery.

Figure 4:
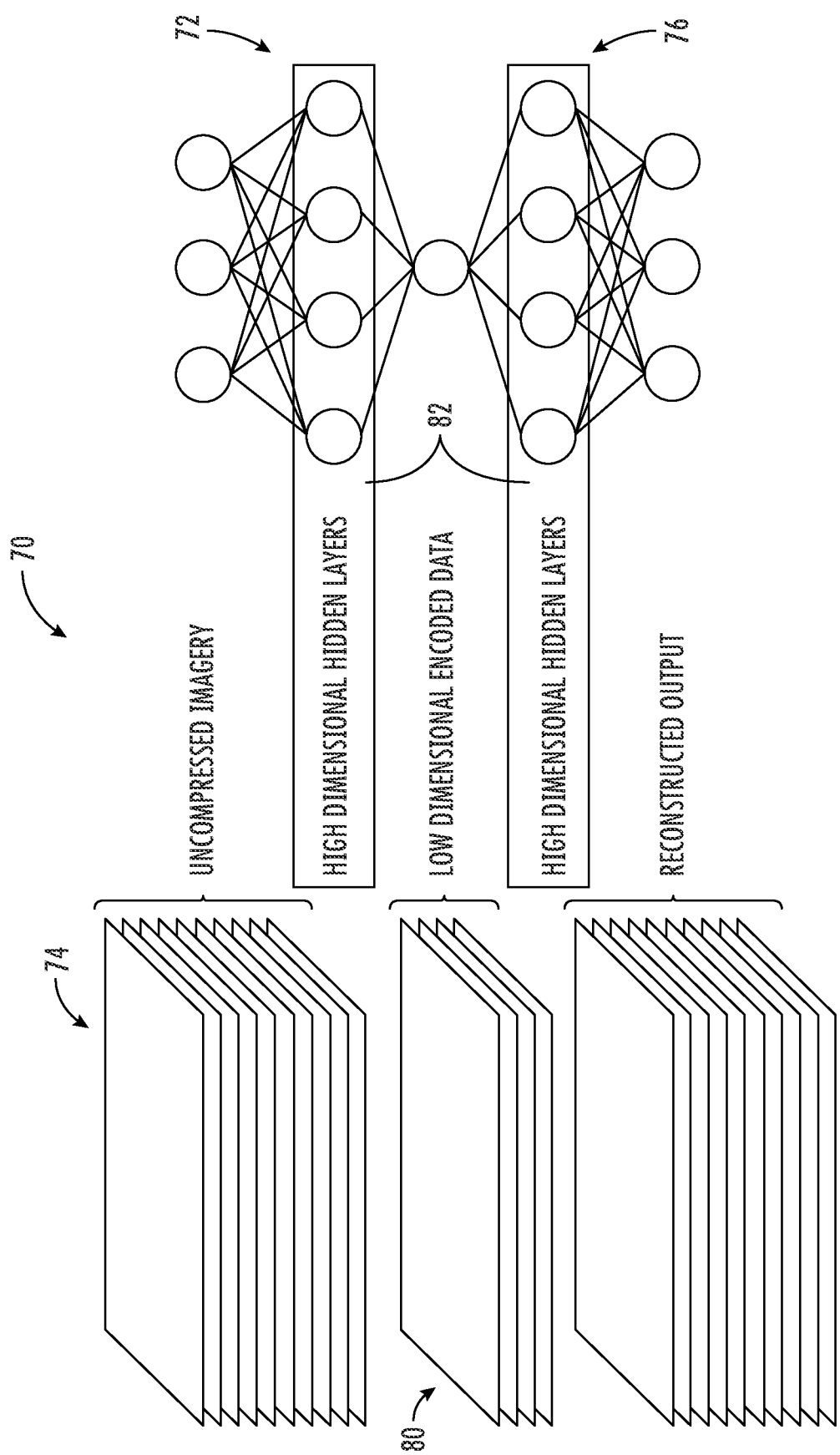
FIG. 4 is a generalized diagram of the autoencoder convolutional neural network architecture for data compression and decompression

Imaging data may be transmitted at various degrees of compression, depending on available bandwidth and power: data compression would occur on the satellite main board 20 using a convolutional neural network autoencoder 70 for statistically optimal image compression. The autoencoder convolutional neural network 70 (FIG. 4) consists of an encoder portion 72 that compresses raw imagery 74 and a decoder portion 76 that decompresses the lower dimensional "latent" representations 80. The compression and decompression mappings are learned by training a number of hidden convolutional layers 82. These hidden layers 82 have higher dimensionality than the input imagery 74 in order to capture complex statistical patterns in the input imagery 74 with a large number of convolutional filters. There may be several latent representations of differing dimensionality to allow for different amounts of lossy data compression.

Different imaging sensors 60 may have different spatial and spectral resolutions available, depending on the specific embodiment. A super resolution convolution neural network may utilize higher resolution information from one wavelength band to infer higher resolution details in another, lower resolution band. In the preferred embodiment, higher resolution imagery will be captured at VIS wavelengths and lower-resolution imagery will be captured at IR wavelengths. A conditional generative adversarial network with a similar architecture to the autoencoder plus skip connections between input and output layers will be used to create super resolution IR imagery using statistical patterns from the VIS imagery.

In addition to the image processing that may occur on board the satellite, the transmitted imagery may be augmented by additional data from other observational platforms or numerical models. The compressed representation of the imagery may also be used for optimal ingestion by numerical model with minimal data decimation. Additional computer vision and artificial intelligence post-processing with more powerful hardware is also possible once data has been transmitted to ground stations.

In general, the foregoing description is provided for exemplary and illustrative purposes; the present invention is not necessarily limited thereto. Rather, those skilled in the art will appreciate that additional modifications, as well as adaptations for particular circumstances, will fall within the scope of the invention as herein shown and described and of the claims appended hereto.

What is claimed is:

1. A satellite for performing earth remote sensing using stereoscopic hyperspectral imaging in the visible (VIS) and infrared (IR) bands, the satellite comprising:
    a sensor system configured for capturing hyperspectral images in the VIS and IR bands;
    an altitude determination and control system (ADCS);
    a main board including a microcontroller unit and memory configured with program instructions to control the sensor system and ADCS;
    a supervisor including a microcontroller unit and configured with program instructions to implement power control of the main board; and
    an electric power system (EPS) configured to supply electrical power to the sensor system, ADCS, main board and supervisor; wherein the main board is further configured with program instructions to:
    direct the sensor system to capture a first hyperspectral image and subsequently capture a second hyperspectral image;
    perform image classification to identify discrete image features in the first and second hyperspectral images; and
    calculate a synthetic baseline between the first and second hyperspectral images.

2. The satellite of claim 1, wherein the satellite occupies a volume 10 cm$^3$ or an integer multiple thereof.

3. The satellite of claim 1, wherein the sensor system includes a plurality of image sensors configured for image capture over different wavelength within the VIS and IR bands.

4. The satellite of claim 3, wherein at least a portion of the plurality of image sensors have independent optics.

5. The satellite of claim 4, wherein at least a portion of the plurality of image sensors share common optics.

6. The satellite of claim 5, wherein the portion of the plurality of image sensors are coupled to the common optics via a beam splitter.

7. The satellite of claim 3, wherein the plurality of image sensors include a complementary metal-oxide-semiconductor (CMOS) currently amended mosaic sensor and a bolometer.

8. The satellite of claim 1, wherein the main board is configured with program instructions to perform artificial intelligence (AI) processing on imaging data from the sensor system.

9. The satellite of claim 1, wherein the ADCS includes a magnetorquer, an inertial measurement unit (IMU), and a sun sensor, and the main board is configured with an attitude control algorithm.

10. The satellite of claim 9, wherein the main board uses attitude control algorithm to detumble the satellite and align the sensor system with a nadir field of view.

11. The satellite of claim 9, wherein the supervisor is configured to redundantly control the ADCS.

12. The satellite of claim 1, wherein the main board includes a radio and the supervisor includes a different radio.

13. The satellite of claim 12, wherein the radio of the main board is a high bandwidth S-band radio and the different radio of the supervisor is a UHF radio.

14. The satellite of claim 1, wherein the supervisor is configured to reset the main board.

15. The satellite of claim 14, wherein the main board communicates with the ADCS and the EPS through the supervisor.

16. The satellite of claim 1, wherein the EPS includes solar panels, a panel deployer, a maximum power point tracking (MPPT) controller, a battery and DC/DC converters.

17. The satellite of claim 16, wherein a cell of the solar panels is dedicated to the supervisor as a redundant power source.

18. The satellite of claim 1, wherein the main board is further configured to determine feature information for the discrete image features using the calculated synthetic baseline.

* * * * *